United States Patent
Lenoir

(12) 
(10) Patent No.: US 6,741,737 B1
(45) Date of Patent: May 25, 2004

(54) SYSTEM AND METHOD FOR THE SECURE DATA ENTRY FROM DOCUMENT IMAGES

(75) Inventor: Wayne Edward Lenoir, Atlanta, GA (US)

(73) Assignee: ChoicePoint Asset Company, Wilmington, DE (US)

( * ) Notice: Subject to any disclaimer, the term of this patent is extended or adjusted under 35 U.S.C. 154(b) by 0 days.

(21) Appl. No.: 09/272,236

(22) Filed: Mar. 18, 1999

(51) Int. Cl.[7] ................................................. G06K 9/00
(52) U.S. Cl. ....................... 382/176; 707/100; 382/305
(58) Field of Search ................................ 707/516, 526, 707/527, 523, 541, 103, 321, 104, 100, 500; 382/100, 176, 101, 102, 111, 203, 173, 112, 113, 305, 306; 235/375; 358/462, 453, 463, 405, 407

(56) References Cited

U.S. PATENT DOCUMENTS

| | | | |
|---|---|---|---|
| 4,949,392 A | 8/1990 | Barski et al. ................ 382/283 |
| 5,140,650 A | 8/1992 | Casey et al. ................ 382/283 |
| 5,293,429 A | * 3/1994 | Pizano et al. ............... 382/202 |
| 5,416,849 A | 5/1995 | Huang ......................... 382/173 |
| 5,430,808 A | 7/1995 | Baird et al. .................. 382/176 |
| 5,486,686 A | * 1/1996 | Zdybel, Jr. et al. ......... 235/375 |
| 5,647,027 A | * 7/1997 | Burges et al. ............... 382/275 |
| 5,748,188 A | * 5/1998 | Hu et al. ..................... 345/326 |
| 5,754,673 A | 5/1998 | Brooks et al. ............... 382/112 |
| 5,781,618 A | * 7/1998 | Baek ....................... 379/100.06 |
| 5,815,595 A | 9/1998 | Gugler ......................... 382/173 |
| 5,822,454 A | 10/1998 | Rangarajan .................. 382/180 |
| 5,841,905 A | 11/1998 | Lee ............................. 382/203 |
| 5,842,195 A | 11/1998 | Peters et al. .................... 707/1 |

* cited by examiner

Primary Examiner—Bhavesh M. Mehta
Assistant Examiner—Seyed Azarian
(74) Attorney, Agent, or Firm—W. Scott Petty, Esq.; King & Spalding, LLP

(57) ABSTRACT

A system and method for the secure entry of textual data contained in a digital image of a document into a database. The image is assigned a document type, a document identifier and a data base record and segmented based on its document type into at least one image segment containing textual data. Each image segment or clip is packetized for transmission via a computer network to a remote location. The data packet includes the image segment, identifying and tracking information, an unpopulated data field within the database record associated with the type of textual information in the image segment and a data entry prompt to be used for entering text into said data field. At a remote location the image clip and prompt are displayed to an operator who then keys in the textual information using the displayed prompt to populate the data field. The data packet having a populated data field and a database record identifier is then sent back to the processing center. There the populated data field is inserted into the database record corresponding to the database record identifier contained in the returned packet.

Alternate embodiments include the ability to send image clips based on the data field type, use of encryption, time stamping of the packets, and providing an alert when the image clip contains illegible textual information, use of priority levels to determine order of processing, use of rules to govern entry of data into the data fields.

79 Claims, 7 Drawing Sheets

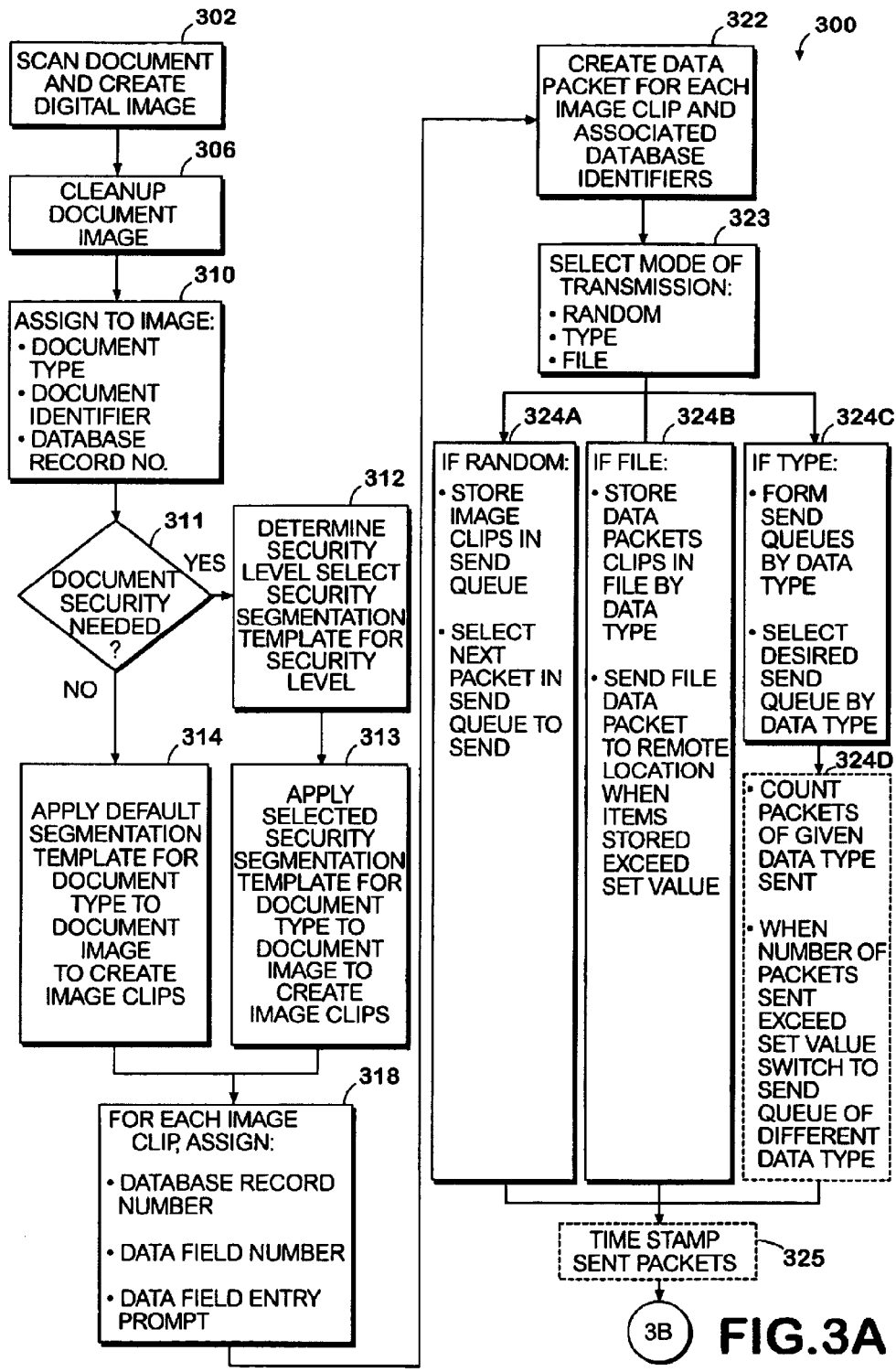

FIG. 4

SYSTEM AND METHOD FOR THE SECURE DATA ENTRY FROM DOCUMENT IMAGES

CROSS-REFERENCE TO RELATED INVENTIONS

Not Applicable

STATEMENT REGARDING FEDERALLY FUNDED RESEARCH

Not Applicable

REFERENCE TO A MICROFICHE INDEX

Not Applicable

COPYRIGHT NOTICE

Copyright 1999. A portion of the disclosure of this patent document contains materials which are subject to copyright protection. The owner has no objection to the facsimile reproduction by anyone of the patent document or patent disclosure, as it appears in the Patent and Trademark Office patent file or records, but otherwise reserves all rights, copyright rights whatsoever.

BACKGROUND OF THE INVENTION

1. Field of the Invention

The present invention relates to the art of extracting information from digital images of forms containing handwritten entries with the images represented as arrays of pixels, and more specifically, to the art of segmenting such images in order to simplify the extraction of handwritten information from the images while ensuring the security of the textual information contained in the images when entering the data into a database. The system of the present invention is particularly useful for segmenting images of standard forms or reports which contains handwritten text and entering that text into appropriate fields of a database.

2. Discussion of Background Information

Transferring data, in particular hand written data, from paper forms containing collected information to data fields within a relational database is a difficult task. In some environments, documents are electronically scanned to generate image files for the documents. Workstations are then provided where one screen or a portion of a screen is used to display all or a portion of a document image and a second screen or a portion of the document display screen is used to provide an input field for a relational database field. The user at the workstation then reads the information from the document image screen and types the information into the input field which populates a data field within a relational database. When documents contain confidential or sensitive information, such as police records, the workstations must be maintained in a secure environment. Nevertheless, because complete documents are presented to a user at a workstation, sensitive information may be viewed by a worker and then disclosed to others, such as newspaper reporters or other unauthorized persons.

Other systems are available to scan documents into a digital image, segment the image into blocks of textual and non-textual data then perform optical character recognition on the text. U.S. Pat. No. 5,430,808 entitled "Image Segmenting Apparatus and Methods" issued Jul. 4, 1995. is an example of such a system. That system segments the image of a scanned document into character or text rectangles and empty rectangles. The analysis of a scanned document image is primarily used to identify the empty rectangles which are then used as a cover set to eliminate the areas of a document that do not contain textual data. That system identifies all of the blank areas by rectangles and then uses that as a cover set to identify the portion of the document image that contains character data which may then be provided to a text extractor for storage. One drawback with this system is that all of the text from the document is complete and available for viewing leading to a possible security breach. Another drawback is the textual data that is generated is not yet in a form suitable for populating the fields of a database. A further drawback is that such as system using optical character recognition does not lend itself to working accurately with information written in widely varying styles. Further, the digital text that is created by an optical character reader is often inaccurate due to skewing or speckling of the original image requiring such text to be manually reviewed. Also, with an automated reader it is not always possible to know where the error will occur requiring that the entire content of the digital text be compared against that in the original image. It would be advantageous for purposes of security to be able to transmit some of those document portions to one remote station and other document portions to another data entry station for entry by an operator into a relational database field. It would also be advantageous to be able to associate the scanned image with the data fields of database allowing for rapid searching capabilities while retaining the ability to view the entire scanned document if needed.

SUMMARY OF THE INVENTION

The present invention is a system and method that facilitates the entry of data into a relational database from paper documents and permits workers to operate in unsecured areas without jeopardizing the security of the information. Specifically, the system of the present invention electronically scans documents containing textual information that is in most cases handwritten. Such documents include police reports and insurance claim reports. A document identifier is created for each image and comprises a document type identifier and for the document tracking number or serial number. A database record is also created for the document, the record having data fields corresponding to the areas of the image containing the relevant textual information. A segmentation template is defined for each document type or form that is used in the system. The template identifies the various portions of the document containing specific data that is to be entered into the associated database record. Each image area is associated with a particular database field, database record and the original image that the image clip was from. Thereafter, as documents are scanned and received at a processing center, the system identifies the document type and the various fields contained within the document. Image clips are created using a segmentation template corresponding to the database fields used with that document type. The image clips and associated database and image identifiers and a data entry prompt for the particular data field involved are packetized for transmission to a remotely located data entry operator. In addition to a data entry prompt, rules and rule parameters can be provided to assist the operator with the entry of the data. In one embodiment, clips of areas containing the same type of data from a plurality of document images are accumulated, organized into a file, compressed, encrypted, and sent to a remote station over an open network such as the Internet. In other embodiment this process can also be employed with individual packets. The image clips from each individual image are sent to multiple remote workers for processing.

At the remote station, software decompresses and decrypts either the data packet or the data file to generate a display of the image clip and the data entry prompt. The data entry operator reads the image clip and then types or keys in the information into the displayed database field. This data along with the appropriate identifiers is then packetized, compressed and encrypted, and returned to the central site. Alternatively, the processed image clips may be collected into a data file for transmission to the central processing location. At the central site, the data in the data fields received from a remote operator are collected for all portions of each document that was segmented and distributed to multiple workers. In this manner, data are collected for each field of a database record associated with the original image and used to populate a relational database corresponding to that document. Because multiple workers receive information from a single document, workers do not know the identity of the persons involved, or if they know the identity of the person, do not know relevant facts from the report to be able to have a complete picture of the content of the document. This system permits data entry workers to work at unsecured sites without jeopardizing the security of information in a scanned document image.

In alternate embodiments of the present invention, time stamping and continuous real time transmission of the images segment is employed. Also, the amount of segmentation of the digital image can be varied in related to the amount of security desired for in the textual information contained in the image clip or a priority rating can be assigned. In another embodiment of the system, operator fatigue functionality is used to limit the number of clips of a particular field that a given operator receives. Further, prompts provided with a clip can be structured to provide guidance to the operator without providing meaning of the information displayed.

BRIEF DESCRIPTION OF THE DRAWINGS

For a better understanding of the invention reference may be made to the preferred embodiments of the invention shown in the accompanying drawings where:

FIG. 1, comprising

FIGS. 3A and FIG. 3B present a detailed flow diagram of the data entry system of the present invention.

FIG. 4 illustrates a display screen that would appear at the processing center or at the client's site after the completion of the data entry process.

DETAILED DESCRIPTION OF THE INVENTION

Figure 1A:
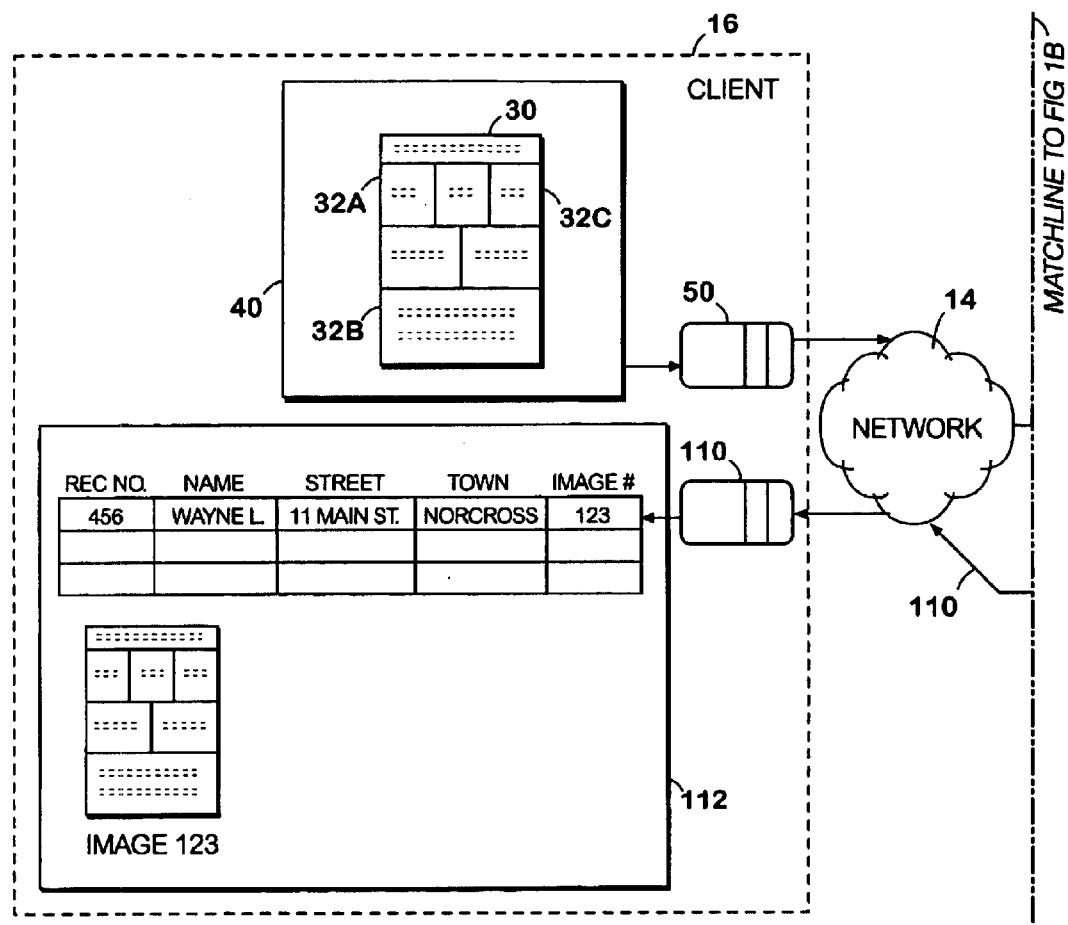
FIG. 1A and FIG. 1B, is a illustration of the document entry system of the present invention.

There has thus been outlined, rather broadly, the more important features of the invention in order that the detailed description thereof that follows may be better understood, and in order that the present contribution to the art may be better appreciated. In the several figures where there are the same or similar elements, those elements will be designated with similar reference numerals. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Figure 1B:
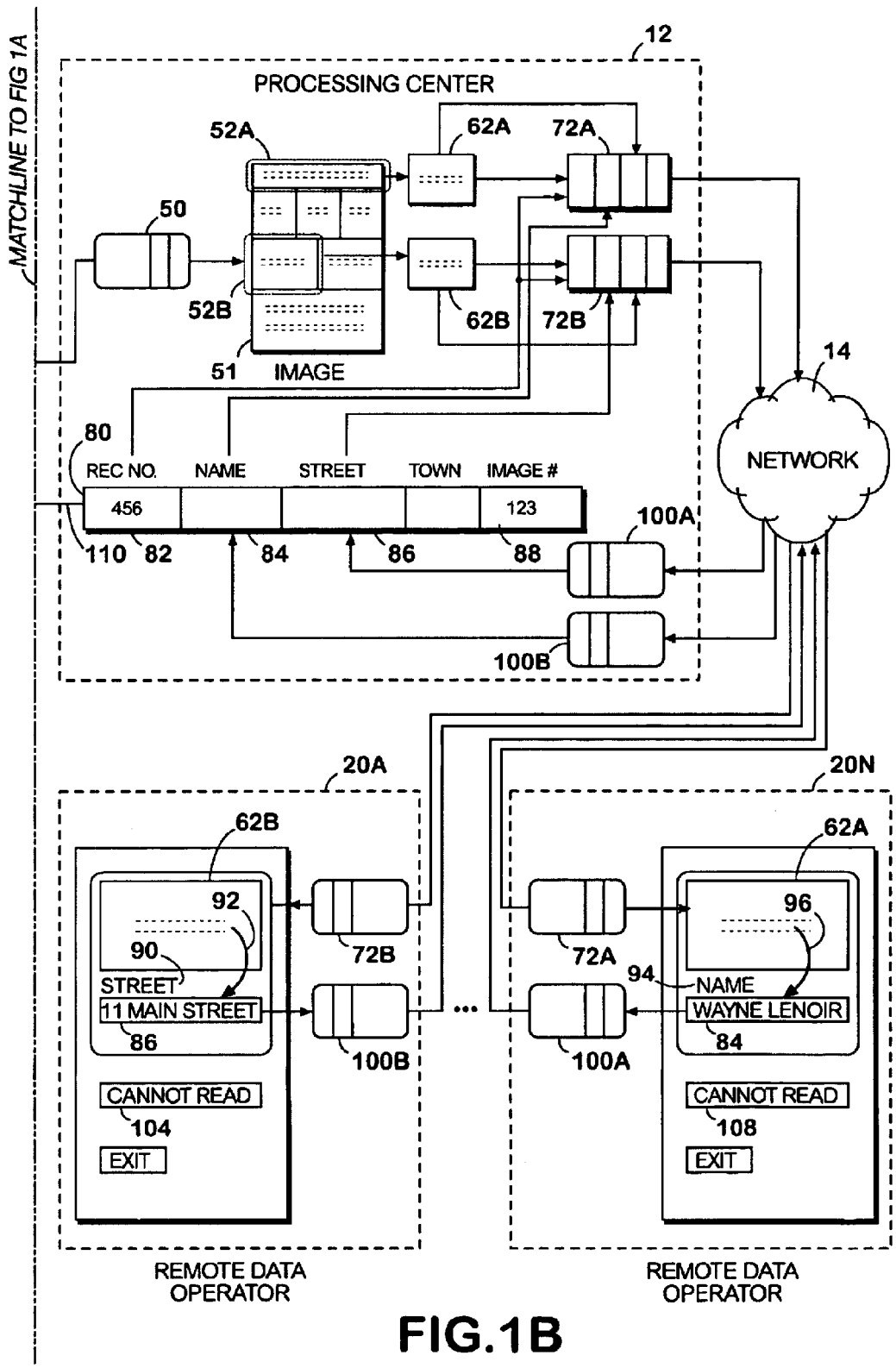

FIG. 1, comprising FIG. 1A and FIG. 1B, illustrates the overall structure of the system 10 used for the secure entry of data from images. In the system 10, the process is focused at processing center 12 which is interconnected via network 14 to one or more clients' sites 16 and one or more remote data operators' sites 20A through 20N. Document 30 can be comprised of one or more pages, each having multiple sections of textual information thereon, either typed or handwritten and indicated at 32A through 32C, is converted via scanner 40 into digital image 50 that is sent via network 14 to processing center 12. The conversion of document 30 into the digital image 50 can be done by numerous apparatus including a digital scanner or a facsimile machine.

At the processing center 12, image 50 is cleaned up to remove the effects of skewing and speckling that may have been introduced during conversion into the digital image. After digital image 50 of the document has been deskewed and despeckled, clean image 51 is assigned a document type, a document identifier and a database record number. These identifiers are used to track the image and its components throughout the system and the processes that are to be performed on the image. The identifiers can include the owner, document location, security level, priority level, and document type. At the processing center 12, a segmentation template 52 is applied to image 51. It will be appreciated that segmentation template 52 may have one or more segmentation segments, 52A, 52B, for the document type that is being processed. The portion of digital image within the boundary of the segment will form the image clip. There is typically one segment for each field of data that is to be extracted and processed. After application of segmentation template 52 to document image 51, image clips 62A, 62B are created. The image clips, which are bit map images, correspond to the data fields in database record 80 that are to be completed with the information that is now contained in image clips 62A, 62B.

The segmentation of image 51 can either be done using an operator or by commercially available form recognition software. For a human forms recognition process, each page is presented to an operator so that a registration point may be associated with each scanned page. The combination of the page format plus the particular registration point (x,y coordinates) of the reference point allows each image clip to be clipped or created. For the forms recognition software, the form is identified and the registration (x,y displacement) relative to a standard image is computed by the software without direct human involvement allowing the image clips to be created.

Each segment or image clip corresponds to a particular data field within the database record. The digital image clips 62A, 62B are packetized along with the database record number 82, database field identifiers, data entry prompts (not shown) and, if previously defined, rules (not shown) into packets that are then transmitted via network 14 to remote users 20A through 20N. Packet 72A contains image clip 62A, database record number 82, the NAME data field 84 and the data entry prompt for the NAME data field. Packet 72B contains image clip 62B, database record number 82, the STREET data field 86 and the data entry prompt for the STREET data field. Advantageously, with this approach because the complete image is broken into smaller segments, the data entry operators will not have access to the complete document. They will have access to only portions of the document and, therefore, are unable to disclose meaningful information. Also advantageously, because of the segmentation which is used on the image, the data that is transmitted through remote operators can be viewed without worry of a security breach since the reason for why that data is being entered is not disclosed to the data entry operator. Data packets 72A, 72B are further packetized to provide the addressing needed for transmission over the network 14 as is known as the art. Various forms of protocols such as FTP, TCP/IP, IPX, HTTP, SMB, SNA and other known communications protocols can be used to effect this network transmission. Data segments 72A, 72B are sent to the remote data operators for completion of the associated database fields.

At each remote data operator the packets addressed to that operator are received. Assume that packet 72A is received by data operator 20N and that packet 72B is received by data operator 20A. As shown at remote data operator 20A, packet 72B is received and processed. As a result of the processing, image clip 62B is displayed to the operator along with a data entry prompt 90 for the STREET data field. The operator reads the textual information 92 contained in image clip 62B. Using a data entry means such as a keyboard or other means the operator enters the textual data, in this case the street address "11 Main Street," into street data field 86 that is shown with data entry prompt 90. At remote data operator 20N, data packet 72A is received. In a similar fashion, data packet 72A is processed and image clip 62A containing the name "Wayne Lenoir" along with the data entry prompt 92 for the NAME data field is displayed for the operator. The operator reads textual information 96 contained in image clip 62A and keys that information into database field 84. Advantageously, inclusion of the data entry prompt in data packets 72 simplifies the nature of the software that has to be installed and maintained at the remote operator locations. If the data entry prompt is not included, the software at the operator locations would have to have the functionality to recognize the type of data in the clip based on the data field and then display the appropriate data entry prompt.

Once the textual information has been keyed into the associated data field, at each remote operator station, the information is then packetized into a return packet to be sent back to processing center 12. At remote operator 20A, packet 100B is created containing the populated database field 86 which contains the street address "11 Main Street" along with the database record number 82. Similarly, data packet 100A is created at remote data operator 20N and contains database record number 82 and populated database field 84 containing the name "Wayne Lenoir." Both packets are further packetized as is known for transmission over network 14 back to processing center 12.

At processing center 12, when packets 100A, 100B are received, the information is extracted from the packets and inserted in the identified database record 80 and fields 84 and 86 that are maintained at the processing center 12. Once database record 80 is completed, the database record and associated image 51 are available for viewing by the client. The database records alone or the database records and images, as shown at 112, may also be transmitted back to the client or they may be stored at processing center 12 but accessed from the client site 16 via network 14. Clients having legacy type database systems are examples of systems that cannot use the images and would only receive the database records.

The processing which is done at the processing center 12 and at the remote data operators is accomplished via work stations or personal computers which have installed thereon the appropriate software program to accomplish the tasks previously described.

Figure 2:
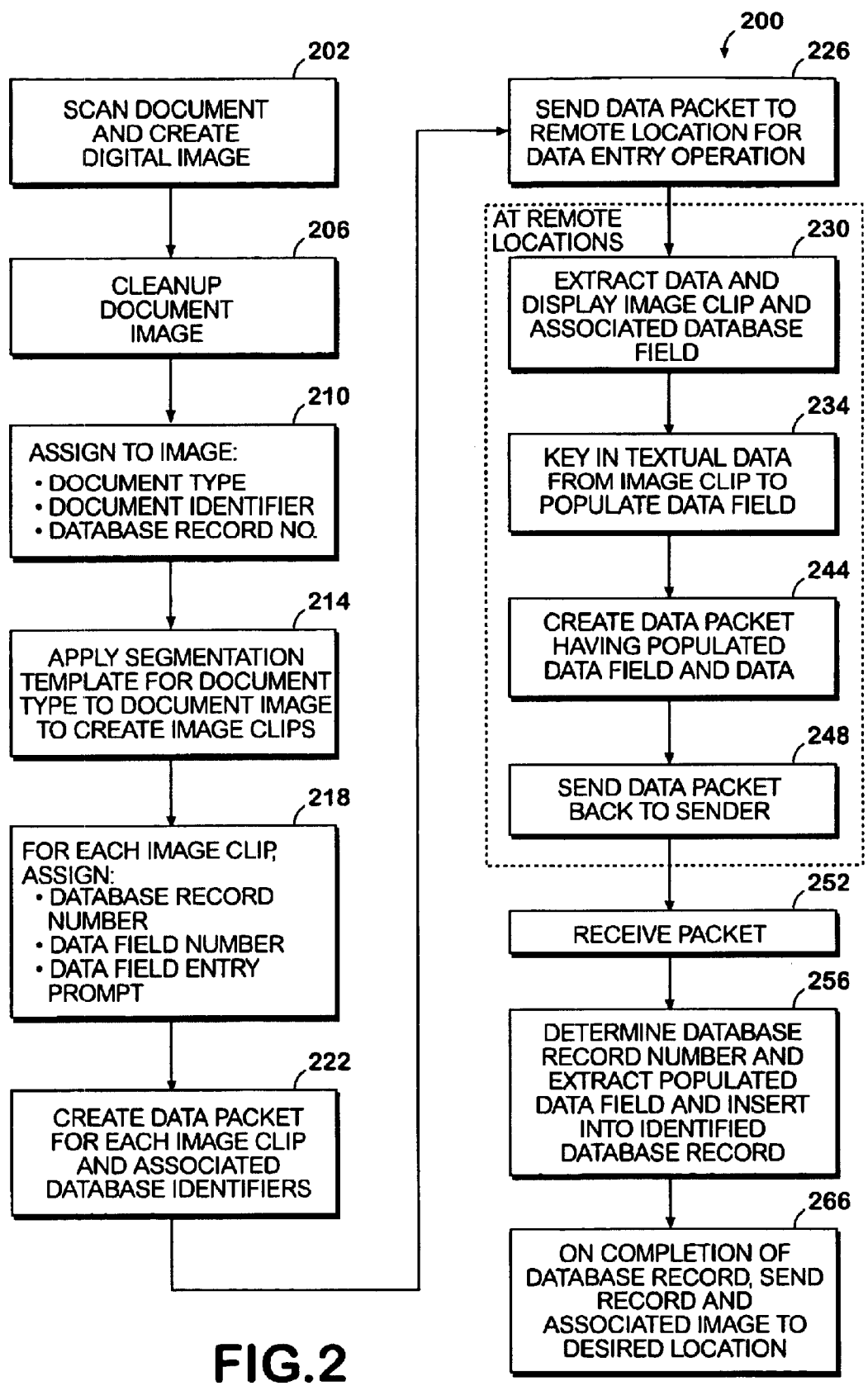
FIG. 2 presents a diagram of the overall processes used in the data entry system of the present invention.

Referring to FIG. 2, the overall process of the system 10 is described. At step 202, the document is scanned and a digital image is created. It should be realized that the scanning of the document, while shown in FIG. 1 as occurring at a location remote from the processing center, may also take place at processing center 12. Thus, the step of the transmission of the image to processing center 12 is not considered crucial to the operation of the system. When the digital image has arrived at processing center 12 by whatever means, the image, at step 206, is cleaned. Typically, this means that the image is deskewed and despeckled as is known in the art to remove the artifacts of the digitizing or scanning processes. Again, it should be realized that the clean-up performed in step 206 may not be needed for every document, but preferably it is performed on every image which is received.

At step 210 the image is assigned a document type, a document identifier as previously described and a database record number. The document type indicates the nature of the document that has been received. The document type can refer to a particular type of form or report and varies from client to client. A document type may indicate that it is, for example, an auto accident form insurance agency or a burglary form from a police department. Also, the document type may also be assigned to the image prior to its receipt at the processing center. The document type can be assigned when the digital image is first created and included as part of the information sent with the image. The document identifier (see 88 in FIG. 1B) is a serial number or other means which is used for tracking image 51 within system 10. Database record number 82 is the database record which is to be associated with image 51 which will contain the textual information that will be extracted from the image by the various remote data operators.

At step 214, a segmentation template for the document type is applied to the image 51 to the create image clips 62A, 62B. At step 218, for each image clip that is created a database record number, a data field number and a data field entry prompt is assigned. A rule and rule parameters can also be assigned. The data field entry prompt is an entry prompt that will display to a data operator information helpful for ensuring correct entry of the data. For instance, if the image clip contains textual data relating to a street address, the data prompt displayed to the remote operator can be "Street." Similarly, if the information dealt with an automobile VIN number, the data prompt can display VIN number. If the information was a date, the prompt can display the format that is required by the database. This allows the operator to change what is displayed into the format required, e.g., "Aug. 18, 1995" to "95/08/18". The prompt is used to alert the data operator as to the type of information which is expected to be entered into the database field. However the prompt is defined so that it provides operator guidance without disclosing the meaning of the information. For example the prompt "1=checked 0=not checked" used with the image containing only a checkbox, informs the operator to enter either a "1" or a "0" into the data field but it does not disclose the meaning of the checkbox to the operator. At step 222, a data package is created for each image clip and associated database identifiers for transmission to the remote database operators. At step 226, the data packets are sent to a remote data entry operation.

The processing that is done is steps 210–218 is possible because the form from which the image is derived has been properly setup or registered in the system. To setup each form the following process is performed. First the paper form pages are enumerated including obverse and reverse sides. After the paper pages are numbered, fields are laid out on the paper form where needed. The fields do not need to include any identifying or explanatory that may be present on the form. A single checkbox can be a field. Each of these fields can be associated with a category. For example, a category such as HEADER, NAMES, SENSITIVE and FORM DATA can be used with the various fields on the pages. The use of a category allows all fields of a given category in a single document or from several documents to be grouped together to form a file that will be assigned to a data entry station to be keyed in by the operator. The number of categories used is not limited by the system. For example, the category HEADER can be used to designate information that is be repeated on each page of a multi-page document. The fields associated with the category HEADER are clipped and keyed only once for each distinct form. As an example of HEADER information, consider an auto accident form on which at most information concerning two automobiles may be entered. A four-car accident requires more than one such form. Certain information, such as date, time, street, cross-street, etc., is repeated on each form, but needs to be keyed in only once and can be categorized as HEADER. The NAME category can be used for name data. The category SENSITIVE can be used with fields containing information such as social security number, or telephone numbers, and can be routed to a particular station for entry. Preferably, these fields will be clipped and keyed separately without any association to a name or an address. Further, the prompt associated with any field can be constructed so that they are less informative by requesting "enter number" instead of stating "social security number." The remaining fields of information fall into the category FORM DATA. Other categories can be defined and the fields categorized however the system operator desires.

The fields that have been defined for the form are located on the form by their position on the front or back of the form, at the top left, etc. and are further defined by their height and width. Next, a data entry prompt and a database field are associated with each field. The database field specifies the data type, the data precision (length, decimal points etc.) and the data field name. Optionally a rule may be assigned to each field. When a rule is invoked, an associated set of parameters is passed along with the rule to guide its application. For example, one rule that can be used is the limitation of input to one of a specific list of constants. These constants can be displayed in list window that pops up when the rule is invoked during the data entry process such as when the associated image clip is displayed or when the operator selects the displayed data field box. The rule and the allowable values or parameters are attached to the field within the data that will be sent to an operator for keying. Any number of rules and values may be associated with a given field. The process just described defines for each form that is used in the system, the segmentation template and the assignment of the database record, the data field number, the data field entry prompt, categories and/or rules.

At each remote location, a number of operations are performed as indicated by the dashed box around steps 230 through 248. At step 230 the image clip is displayed to the operator along with the associated data field prompt. At step 234, the operator keys in textual data from the image to populate the data field. At one of these two steps any rules that are associated with the field would be invoked. Next, at step 244, the data packet is created at containing the populated data field and database record number and this data packet is sent back to the processing center at step 248.

At step 252, the data packet from the remote operator is received back at processing center 12, the original sending location. At step 256, the database record number is extracted from the data packet and the database field is populated with the data contained in the data field of the packet into the identified database record. At step 266, on completion of the database record, the record and associated image are then sent to the desired location. This location can be storage at the data processing center. The database records alone may be downloaded into a client's legacy-type database which is not capable of accepting data images. The data and image may be downloaded into a database capable of displaying digital images or stored on DVD or optical disks.

Referring now to FIG. 3 a more detail description of the process including several alternative embodiments is described. Steps having the same or similar functionality to those described in FIG. 2 will carry a similar reference numeral and will either not be discussed or only briefly discussed. Steps 302, 306 and 310 are substantially the same as steps 202, 206, and 210, respectively, previously discussed. Although not shown, at step 310 a priority level can be assigned to the image which will allow higher priority documents to be processed ahead of lower priority documents. The priority level is also associated with each image clip. At step 311 an alternative embodiment is considered. There it is determined whether document security is needed. For instance, some documents and their images contain publicly available information which needs to be entered into a database. Therefore, the need for document security is low. Other documents may contain information related to an ongoing criminal investigation and that information is extremely sensitive requiring a higher level of security. If it is determined that document security is needed, the process proceeds to step 312 where the security level needed is determined and security template appropriate to the determined security level is selected. The segmentation used on the image will vary, decreasing with lowering security levels and increasing with raising security levels. Increase of segmentation means that the size of the image clips and the information contained therein is reduced allowing less information to be seen in any one particular image. After the security level and segmentation level are determined, the process proceeds to step 313 where the appropriate segmentation template, as determined by the security level, for the document type is applied to the document image to create the image clips. At step 311 where the need for document security is requested, if the answer is no, the process proceeds from step 311 to step 314 and a default segmentation template or low security segmentation template for that document type is applied.

Next at step 318, for each image clip a database record number, a data field number, a data field entry prompt, and, if present a priority level, is assigned. At step 322, a data packet is created for each image clip and its associated database identifiers. At step 323, another alternate embodiment is present. There a mode of transmission of the data clips may be selected. Three types of transmission modes are available, random, type (or category) and file. Random transmission means that the image clips that are created for a given document are randomly selected and sent to the remote data operators. Type transmission means that the image clips are sent by category of data contained. For instance, only name type data may be sent to a particular remote operator or street type data may be sent to another operator. File transmission means that similar types or categories of data are first grouped together into a file which is then sent to a remote operator for batch processing. When random or type transmission is used, the process typically sends a single data packet to each operator. When that packet is completed and returned, another packet is sent. With file type transmission, numerous data packets are collected and sent to the operator for batch entry.

If "random" transmission is selected, the process proceeds to step 324A. At that step, the image clips are stored in a send queue as they are created. The next packet in the send queue is then selected to be sent to a remote operator unless packets having a higher priority level are present then those packets are sent first. No selection of data type is used in choosing which image clip is sent to which operator. If "file" transmission is selected, the process proceeds to step 324B. There the data clips are stored in a file by data type. The data file is then sent to the remote location when the number of items in the file reaches the set amount. If the "type" mode of transmission selected is type, the process proceeds to step 324C. There, the send queues are formed by data type and a send queue is selected for transmission by the desired data type. Again if present higher priority packets are sent first. Steps 324A, 324B and 324C may then proceed to step 325.

In an alternate embodiment, after the completion of Step 324C, further optional functionality may be applied. At step 324D, the number of packets of a given type that are sent are counted and when the number of packets exceed a set value, a change or switch occurs in the type of data that is sent and a new send queue is selected. Advantageously, the use of this functionality allows for increased operator productivity by varying the type of data which an operator will see. Initially, the operator receives one type of data and by entering a single type of data, productivity is increased. However, after a period of time of entering the same type of data, an operator may become bored or distracted. By changing the type of data which the operator has to enter, operator's interest is maintained and accuracy and productivity is increased for the data which is entered.

Figure 3B:
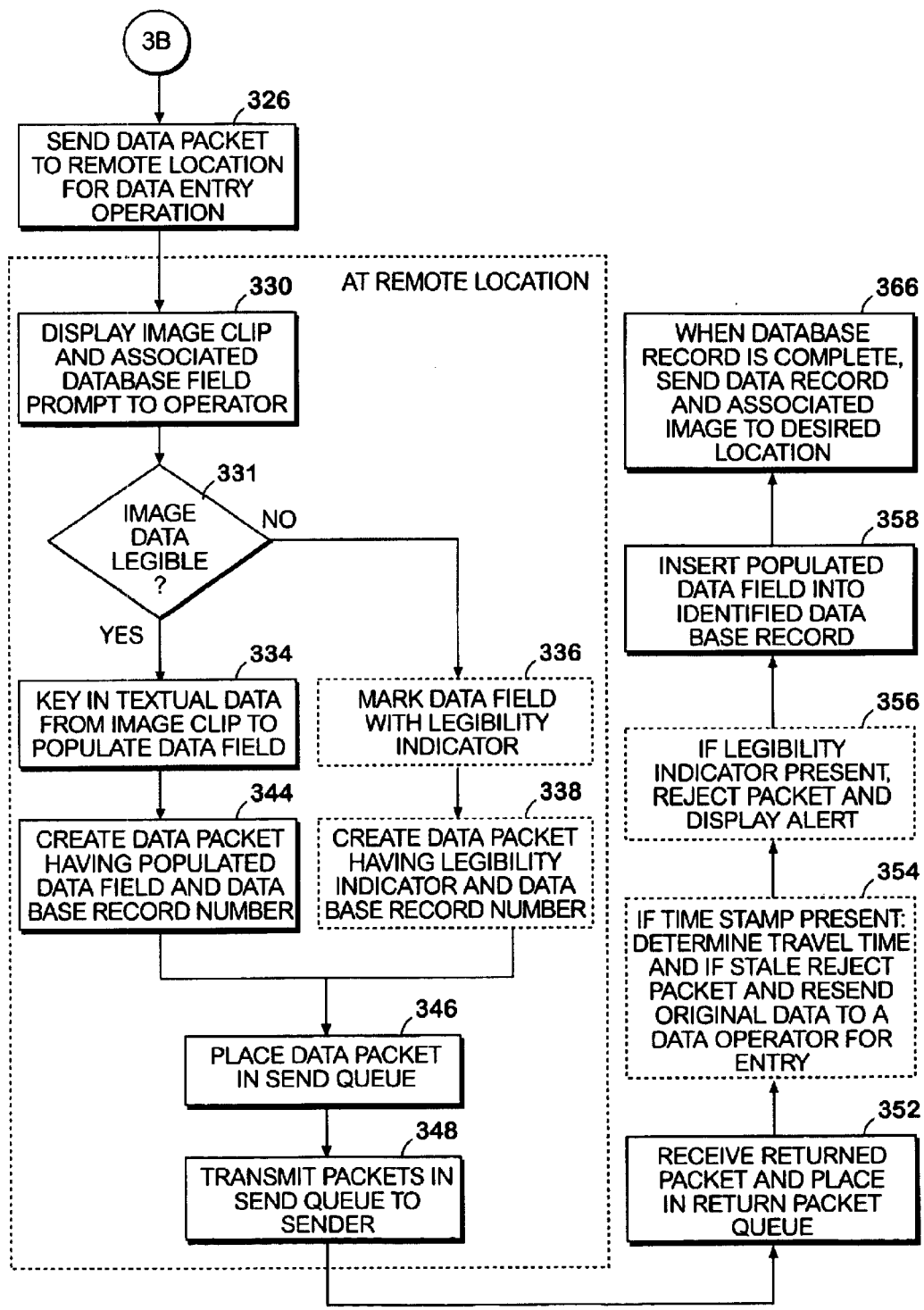

Steps 324D and 325 are shown in dashed blocks to indicate that these steps are optional steps in the process. Other optional steps in this process again are shown in FIGS. 3A and 3B by the dashed block. At step 325, if the functionality is desired, the packets that are sent are time stamped. Time stamping allows the process to determine the amount of time between when a given packet was sent to a remote operator for processing and when it was returned to the sending or processing center 12. If the amount of time exceeds a predetermined value, the processing station after preliminary processing of the returned packets can reject the returned packets. Time stamping is performed in order to prevent having stale data. Should a remote operator be unable to enter the data within a given period of time, that data can then be sent to another operator for entry. By using time stamping, this advantageously allows the system to achieve a rapid turn around time in the processing of the digital images and the textual data contained therein. Preferably, if time stamping is used, the oldest packets are presented first for transmission or processing. However, if priority levels are used, higher priority packets can be sent and processed ahead of older packets. After time stamping, if selected, the process proceeds to step 326 where the data packet is sent to a remote location for the data entry operation.

As shown in FIG. 3B by the dashed and dotted lines, steps 330 through 348 of the process are performed at each remote location receiving data packets. At step 330, the image clip is displayed along with the associated database prompt. In cases where there are multiple image clips present, time stamping and/or priority levels can be used to order the clips for processing. At step 331, additional new functionality is introduced to determine if the image data shown in the image clip is legible to the operator. If the data is legible, the process proceeds to step 334 at which the point the operator keys in the textual data from the image clip to populate the associated data field using the database prompt. Next, the data packet is created having a populated data field and database record number at step 344. If at step 331, the image data is not legible then the process can proceed to optional steps 336 and 338 as indicated by the dashed blocks. At step 336, the data field is marked with a legibility indicator. This can be accomplished via a prompt (see FIG. 1, reference numeral 104 or 108) appearing on the operator's display which may be activated by the operator such as by a mouse click or a keystroke. As a result the packet may be sent to a supervisor located at the remote location for deciphering and processing of the illegible content. If deciphering is not possible, the process proceeds then to step 338 where a data packet is created having a legibility indicator in the associated database record number and data field. Alternatively, in lieu of or in addition to use of the legibility indicator the data field can be filled with null data or a special code word. The process proceeds to step 346 where the data packet is placed in a send queue at the remote location. At step 348, the packets in the send queue are transmitted to the sending or central processing location 12. Again the time stamp or priority level can be used to reorder the sending sequence to send the oldest or the highest priority packets first.

At the sending location in step 352, the return packet is received and placed into a return packet queue. Ordering of the packets in the return queue can be affected by the time stamp or priority level of the packet, if these features are used. If time stamp functionality has been employed, the process proceeds to optional step 354 to determine if the time stamp value is valid, i.e., that the time period between sending and receipt falls within a predetermined range. If this is the case, the returned packets is accepted for further processing. If not, the original image clip and related database components and identifiers are retransmitted to the same or another remote operator for processing. If the legibility indicator is present, the process proceeds to optional step 356 where the data packet is rejected and an alert is displayed for the processing center operator. At step 358, the populated data field is inserted into the identified database record. At step 366 when the database record for the image is complete, the data record and/or the associated image are sent to the desired location.

Figure 4:
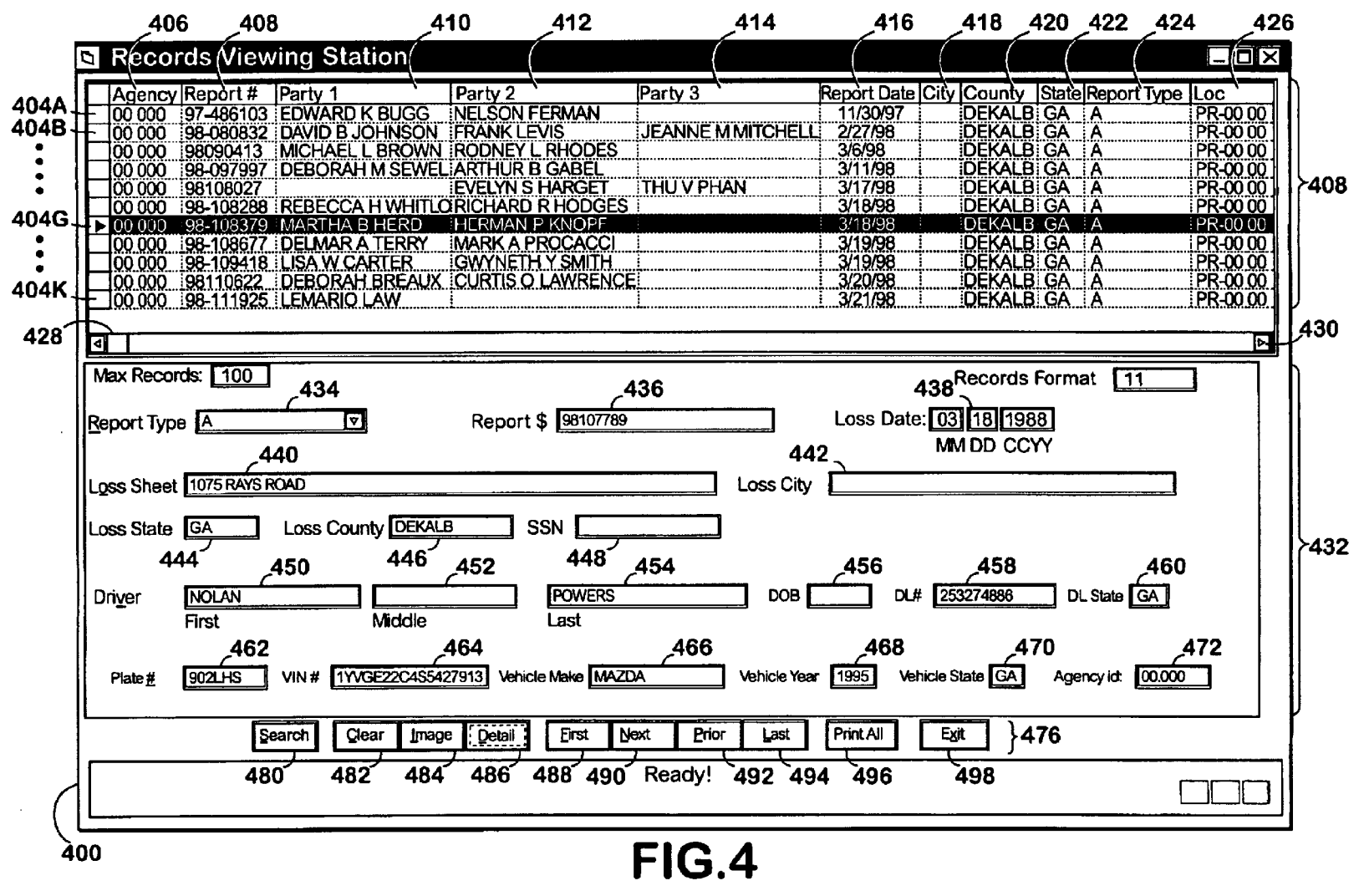

FIG. 4 illustrates a display screen 400 showing a table containing multiple database records along with a display of the record highlighted in the table. In the top portion of the screen, a tabular view 402 of eleven database records 404A–404K of a database is shown. The display shows eleven columns, each column representing a field in the database. As shown there, the eleven columns (fields) shown are agency 406, report number 408, party one 410, party two 412, party three 414, report date 416, city 418, county 420, state 422, report type 424, and location 426. Beneath each column heading are relevant data for a given database record with respect to each one of the data fields. Record 404G is highlighted as shown by the black bar extending across the columns. Additional data fields, if presented may be viewed by using the left and right horizontal scroll arrows 428 and 430, respectively. Scroll arrow 430 would be clicked on to bring location column 426 into view.

Beneath the tabular view 402 in a second portion of the display 400, the completed record 423 of information for highlighted record 404G is displayed. As shown there for highlighted record 404G, the following data fields and information contained in that field are shown given: report type 434, report number 436, loss date 438, loss street 440, loss city 442, loss state 444, loss county 446, social security number (SSN) 448, driver first name 450, driver middle name 452, driver last name 454, date of birth (DOB) 456, driver's license number (DL#) 458, driver's license (DL) state 460, vehicle plate number 462, vehicle identification number (VIN#) 464, vehicle make 466, vehicle year 468, vehicle state 470 and agency ID 472. In a third portion 476 of display screen 400 beneath the displayed database record 432 is an array of control buttons which may be clicked on by the operator provide control functions and navigational functionality for moving within the database. "Search" button 480 allows a search of the database. "Clear" button 482 permits the database record image to be cleared. "Image" button 484 will display an image of the associated report in which the information was originally hand entered. "Detail" button 486 will provide further information not shown on the screen. "First" button 488, "next" button 490, "prior" button 492 and "last" button 494 will move the user within the records of the database as indicated by the label of the button. "Print all" button 496 provides for printing a report of the screen and "exit" button 498 is provided for leaving the database. As can be seen for some of the fields the information is blank. At times information is illegible and cannot be read or entered into the database. In such cases, that particular field will be left blank as indicated at field 448 in FIG. 4. Also depending upon the privileges of the operator viewing the display screen 400, the operator can have the authority to click on a field in the database record 432 and enter data or modify existing data.

Figure 5:
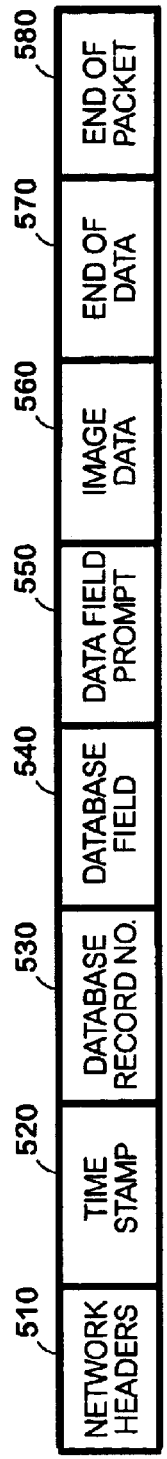
FIG. 5 presents the data package structure that is sent to a remote operator which contains an image clip to be processed.
Figure 6A:
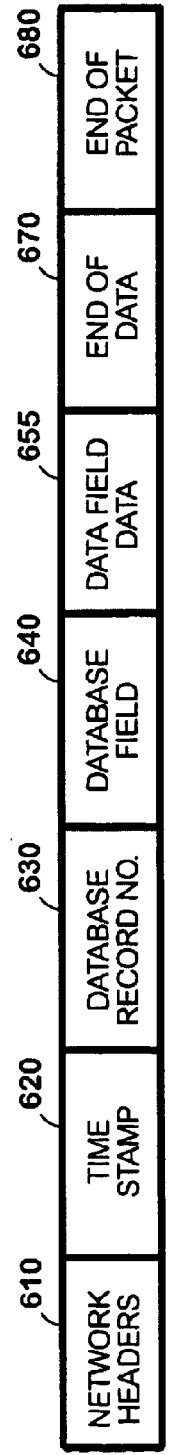
FIG. 6A presents the data package structure that is returned from an operator after successful processing of the an image clip.
Figure 6B:
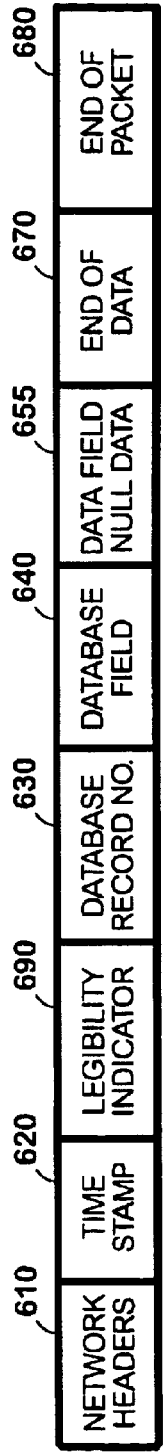
FIG. 6B presents the data package structure that is returned from an operator where the textual data in the image clip was illegible.

FIG. 5 illustrates the structure of the data packet which is sent to the remote operators. The data packet 500 comprises the following segments: network headers 510, time stamp 520, if used, database record number 530, database field 540, database field prompt 550, image data 560, end of data indicator 570 and end of packet indicator 580. If rules are associated with a database field, those rules and their parameters would be included with either segment 540 or 550 or in an additional segment not shown. This data package structure is used to facilitate the transmission of the information over the computer network in which the processing center 12, remote data operators 20A–20N and the client 16 operate. FIGS. 6A and 6B illustrate two versions 600A and 600B, respectively, of the data packet that is returned from the remote operator 20. In FIG. 6A, a normal data packet 600A is returned. This means that the image clip textual information was legible and enterable by the remote operator 20. The return data packet 600A comprises the following segments: network headers 610, time stamp 620, if used, database record number 630, database field 640, data field data 655, end of data indicator 670, and end of packet indicator 680. In FIG. 6B, the returned data packet 600B includes an additional segment-legibility indicator 690 indicating that the textual data in the image clip was illegible to the operator. In lieu of or in addition to use of the legibility indicator, data field data 655 may contain null data. The remaining segments of data packet 600B are the same as those in data packet 600A shown in FIG. 6A. Except for the network header segments and the end of packet segment, the arrangement of the remaining segments within the data packets is not critical. Although not shown the priority level can be provided as an additional segment in each of the packets shown in FIGS. 5, 6A, and 6B.

In an alternate embodiment of the invention, encryption may be used during the transmission of the data from the client location 16 to the processing center and between the processing center 12 and the remote data operators. The type of encryption technique used can be selected depending upon the security level desired. Private key encryption/decryption, public key/private key encryption/decryption, such as BSAFE, PGP, DES, and Triple DES are all encryption/decryption techniques that can be chosen depending upon the security level desired for the transmission. Also, in regard to security of the document, as previously mentioned the segmentation template which serves as the means for segmenting the document may also vary not only the number of segments but the size of those segments. Again, reducing the amount of data contained with any one segment to a lesser amount.

The descriptions given herein are provided as examples and are not intended to limit the principles or scope of the present invention. Those skilled in the art would readily appreciate from a review of the descriptions herein that many modifications, changes or extensions may be made from the specific embodiment described herein without departing from the scope of the invention defined by the following claims.

What is claimed:

1. A system for the secure entry of textual data contained in a digital image of a document into a database, comprising:
   a computer and program installed therein operatively comprising:
      assignment means for assigning a document type, a document identifier and a database record to the digital image of a document;
      segmentation means for segmenting the digital image based on its document type into at least one image segment containing textual data,
      packetizing and transmission means for creating for each image segment a data packet and transmitting the data packet to a remote location for the processing of the image segment to populate a data field in the database record, the data packet comprising the image segment, a database record identifier associated with the image, an unpopulated data field within the database record associated with the type of textual information in the image segment and a data entry prompt to be used for entering text into said data field; and processing means for receiving a processed return data packet received from the remote location, the return data packet comprised of a populated data field and a database record identifier, the processing means inserting the populated data field into the database record corresponding to the database record identifier contained in the return packet.

2. The system of claim 1 further comprising means for randomly selecting data packets that are sent to the remote location.

3. The system of claim 1 further comprising means for selecting data packets that are sent to the remote location based on the type of the data field contained in the data packet.

4. The system of claim 3 wherein the means for selecting data packets further includes means for assembling the data packets into a data file to be sent to the remote location, the data file composed of a predetermined number of data packets.

5. The system of claim 3 further comprising means for continually sending data packets to the remote location and means for monitoring the number of data packets sent to the remote location and when the data packets sent exceed a predetermined amount sending data packets containing another type of data field.

6. The system of claim 5 further comprising:
means for determining a period of time between when a given data packet was sent to the remote location and the time the return data packet corresponding to the sent data packet was received; and
means for rejecting the return data packet if the period of time exceeds a predetermined amount.

7. The system of claim 1 further comprising:
means for determining a period of time between when a given data packet was sent to the remote location and the time the return data packet corresponding to the sent data packet was received; and
means for rejecting the return data packet if the.period of time exceeds a predetermined amount.

8. The system of claim 2 further comprising:
means for determining a period of time between when a given data packet was sent to the remote location and the time the return data packet corresponding to the sent data packet was received; and
means for rejecting the return data packet if the period of time exceeds a predetermined amount.

9. The system of claim 3 further comprising:
means for determining a period of time between when a given data packet was sent to the remote location and the time the return data packet corresponding to the sent data packet was received; and
means for rejecting the return data packet if the period of time exceeds a predetermined amount.

10. The system of claim 1 further comprising converter means for encrypting the data packet prior to transmission and decrypting return data packets.

11. The system of claim 10 wherein the encryption and decryption used is chosen from the group of encryption/ decryption techniques consisting of: private key and private key/public key.

12. The system of claim 11 wherein the document identifier further comprises a security level indicator with said converter means varying the encryption/decryption used depending upon the security level indicator for the document.

13. The system of claim 1 wherein the document identifier further comprises a security level indicator with said segmentation means varying the number and size of the image segments created depending upon the security level indicator for the document.

14. The system of claim 2 further comprising converter means for encrypting the data packet prior to transmission and decrypting return data packets.

15. The system of claim 14 wherein the encryption and decryption used is chosen from the group of encryption/ decryption techniques consisting of: private key and private key/public key.

16. The system of claim 15 wherein the document identifier further comprises a security level indicator with said converter means varying the encryption/decryption used depending upon the security level indicator for the document.

17. The system of claim 2 wherein the document identifier further comprises a security level indicator with said segmentation means varying the number and size of the image segments created depending upon the security level indicator for the document.

18. The system of claim 3 further comprising converter means for encrypting the data packet prior to transmission and decrypting returned data packets.

19. The system of claim 18 wherein the encryption and decryption used is chosen from the group of encryption/ decryption techniques consisting of: private key and private key/public key.

20. The system of claim 19 wherein the document identifier further comprises a security level indicator with said converter means varying the encryption/decryption used depending upon the security level indicator for the document.

21. The system of claim 3 wherein the document identifier further comprises a security level indicator with said segmentation means varying the number and size of the image segments created depending upon the security level indicator for the document.

22. The system of claim 1 further comprising:
the packetizing and transmission means assigning a priority level to each data packet, the packetizing and transmission means further comprising a send queue for data packets in which the data packets to be sent are sent based on their priority level; and
the processing means further comprising means for determining the priority level of the return data packet with the processing means processing of the return data packet based on its priority level.

23. A system for the secure entry of textual data contained in a digital image of a document into a database, comprising:
means for creating a digital image of a document;
a first computer and program installed therein operatively comprising:
assignment means for assigning a document type, a document identifier and a database record to the digital image of a document;
segmentation means for segmenting the digital image based on its document type into at least one image segment containing textual data, and packetizing and transmission means for creating for each image segment a data packet and transmitting the data packet to a given remote location, the data packet comprising the image segment, a database record identifier associated with the image segment, an unpopulated data field within the database record associated with the type of textual information in the image segment and a data entry prompt to be used for entering text into said data field; and processing means for receiving a processed return data packet received from the remote location, the return data packet comprised of a populated data field and a database record identifier, the processing means inserting the populated data field into the database record corresponding to the database record identifier contained in the return packet;

and, at each remote location, a data entry computer and program installed therein operatively comprising:

means for receiving the data packet and extracting therefrom the image segment and associated data prompt for processing;

display means for displaying to a data entry operator the extracted image segment and the data entry prompt;

data entry means allowing the data entry operator to populate the unpopulated data field with textual data contained in the associated image segment; and packetizing and transmission means for creating a return data packet and transmitting the return data packet to the first computer, the return packet comprising a populated data field and the database record identifier corresponding to that in the received data packet.

24. The system of claim 23 wherein the first computer further comprises means for randomly selecting data packets that are sent to a given remote location.

25. The system of claim 23 wherein the first computer further comprises means for selecting data packets that are sent to a given remote location based on the type of the data field contained in the data packet.

26. The system of claim 25 wherein the means for selecting data packets further includes means for assembling the data packets into a data file to be sent to the remote location, the data file composed of a predetermined number of data packets.

27. The system of claim 26 wherein the first computer further comprises means for continually sending data packets to a given remote location and means for monitoring the number of data packets sent to that given remote location and when the data packets sent exceed a predetermined amount sending data packets containing another type of data field.

28. The system of claim 27 wherein the first computer further comprises:

means for determining a period of time between when a given data packet was sent to a given remote location and the time the return data packet corresponding to the sent data packet was received; and means for rejecting the return data packet if the period of time exceeds a predetermined amount.

29. The system of claim 23 wherein the first computer further comprises:

means for determining a period of time between when a given data packet was sent to a given remote location and the time the return data packet corresponding to the sent data packet was received; and means for rejecting the return data packet if the period of time exceeds a predetermined amount.

30. The system of claim 24 wherein the first computer further comprises:

means for determining a period of time between when a given data packet was sent to a given remote location and the time the return data packet corresponding to the sent data packet was received; and means for rejecting the return data packet if the period of time exceeds a predetermined amount.

31. The system of claim 25 wherein the first computer further comprises:

means for determining a period of time between when a given data packet was sent to a given remote location and the time the return data packet corresponding to the sent data packet was received; and means for rejecting the return data packet if the period of time exceeds a predetermined amount.

32. The system of claim 23 wherein the first computer and each data entry computer each further comprise converter means for encrypting the data packet prior to transmission and decrypting encrypted data packets.

33. The system of claim 32 wherein the encryption and decryption used is chosen from the group of encryption/decryption techniques consisting of private key and private key/public key.

34. The system of claim 33 wherein the document identifier further comprises a security level indicator with the converter means of the first computer varying the encryption and decryption technique used depending upon the security level indicator for the document.

35. The system of claim 23 wherein the document identifier further comprises a security level indicator with said segmentation means varying the number and size of the image segments created depending upon the security level indicator for the document.

36. The system of claim 24 wherein the first computer and each data entry computer each further comprise converter means for encrypting the data packet prior to transmission and decrypting encrypted data packets.

37. The system of claim 36 wherein the encryption and decryption used is chosen from the group of encryption/decryption techniques consisting of: private key and private key/public key.

38. The system of claim 37 wherein the document identifier further comprises a security level indicator with the converter means of the first computer varying the encryption and decryption used depending upon the security level indicator for the document.

39. The system of claim 24 wherein the document identifier further comprises a security level indicator with said segmentation means varying the number and size of the image segments created depending upon the security level indicator for the document.

40. The system of claim 25 wherein the first computer and each data entry computer each further comprise converter means for encrypting the data packet prior to transmission and decrypting encrypted data packets.

41. The system of claim 40 wherein the encryption and decryption used is chosen from the group of encryption/decryption techniques consisting of: private key and private key/public key.

42. The system of claim 41 wherein the document identifier further comprises a security level indicator with the converter means of the first computer varying the encryption and decryption used depending upon the security level indicator for the document.

43. The system of claim 25 wherein the document identifier further comprises a security level indicator with said segmentation means varying the number and size of the image segments created depending upon the security level indicator for the document.

44. The system of claim 23 further comprising:
the packetizing and transmission means of the first computer further comprising means for assigning a priority level to each data packet;
the packetizing and transmission means of the first computer and the packetizing and transmission means of each data entry computer sending data packets in order of the assigned priority level; and
the processing means of the first computer and the means for receiving and extracting of each data entry computer each processing data packets based on their assigned priority level.

45. A system for the secure entry of textual data contained in a digital image of a document into a database, comprising:
a first computer and program installed therein operatively comprising:
assignment means for assigning a document type, a document identifier and a database record to the digital image of a document;
segmentation means for segmenting the digital image based on its document type into at least one image segment containing textual data,
packetizing means for creating for each image segment a data packet for transmission to a remote location for processing, the data packet comprising the image segment, a database record identifier associated with the image, an unpopulated data field within the database record associated with the type of textual information in the image segment, a data entry prompt to be used for entering text into said data field, a priority level, and, for at least one predetermined data field, a rule having one or more rule parameters used to control the entry of text into the data field, and a priority level;
packet sending means for sending the data packet to the remote location, the packet sending means including a send queue for holding data packets to be sent with the data packets to be sent placed in the send queue based on their priority level; and
processing means for receiving and processing a return data packet received from the remote location, the return data having a populated data field, the database record identifier and the priority level, the processing means including a return packet queue for holding return data packets awaiting processing with the returned data packets placed in the return queue based on their priority level, and the processing means removing the populated data field from the packet and inserting it into the database record corresponding to the database record identifier contained in the returned packet;
and, at each remote location,
a data entry computer and program installed therein operatively comprising:
means for receiving and processing a data packet received from the first computer based on the priority level of the received data packet;
display means for displaying the associated image segment and the data entry prompt to a data entry operator contained in the received data packet;
data entry means allowing the data entry operator to populate the unpopulated data field with textual data contained in the associated image segment;
said data entry being in accordance with the rule and the rule parameters if present, and
packetizing and transmission means for creating a return data packet and for transmitting the return data packet to the first computer, the return packet comprising a populated data field and the database record identifier and priority level corresponding to those in the received data packet, the packetizing and transmission means including a send queue for the return packets to be sent in which the return data packets are sent based on their priority level.

46. The system of claim 45 wherein the first computer and program further comprise means for randomly selecting data packets that are sent to a given remote location.

47. The system of claim 45 wherein the first computer and program further comprise means for selecting data packets that are sent to a given remote location based on the type of the data field contained in the data packet.

48. The system of claim 47 wherein the first computer and program further comprise wherein the means for selecting data packets further includes means for assembling the data packets into a data file to be sent, the data file composed of a predetermined number of data packets.

49. The system of claim 47 wherein the first computer and program further comprise means for continually sending data packets to a given remote location and means for monitoring the number of data packets sent to that given remote location and when the data packets sent exceed a predetermined amount sending data packets containing another type of data field.

50. The system of claim 49 further comprising:
means for determining a period of time between when data packet having a given database record identifier was sent to a given remote location and the time the return data packet corresponding to the sent data packet was received; and
means for rejecting the return data packet if the period of time exceeds a predetermined amount.

51. The system of claim 45 wherein the first computer and program and the data entry computer and program each further comprise converter means for encrypting the data packet prior to transmission and decrypting received data packets.

52. The system of claim 51 wherein the encryption and decryption used is chosen from the group of encryption/decryption techniques consisting of: private key and private key/public key.

53. The system of claim 52 wherein the document identifier further comprises a security level indicator with the converter means of the first computer varying the encryption and decryption used depending upon the security level indicator for the document.

54. The system of claim 45 wherein the document identifier further comprises a security level indicator with said segmentation means varying the number and size of the image segments created depending upon the security level indicator for the document.

55. In a computer network, a method for the secure entry of textual data contained in a digital image of a document into a database, comprising:
at a sending location:
creating a digital image of the document;
assigning a document type, a document identifier and a data base record to the digital image of a document;
segmenting the digital image based on its document type into at least one image segment containing textual data, packetizing each image segment into a data packet for transmission to a remote location, the data packet comprising the image segment, a database record identifier associated with the image segment, an unpopulated data field within the database record associated with the type of textual information in the image segment and a data entry prompt to be used for entering text into said data field;

sending the data packet to at least one remote location;

at a given remote location:

receiving the sent data packet and extracting the image segment and data prompt;

displaying to a data entry operator the extracted image segment and the data entry prompt;

populating the unpopulated data field with textual data contained in the associated image segment by having the data operator enter the textual data via the displayed data entry prompt; and packetizing a return data packet for transmission to the first computer, the return packet comprising a populated data field and the database record identifier corresponding to that in the sent data packet; and sending the return data packet to the sending location;

at the sending location:

receiving returned data packets having populated data fields and inserting the populated data field into the database record corresponding to the database record identifier contained in the returned packet.

56. The method system of claim 55 further comprising randomly selecting the data packets that are to be sent to a given remote location.

57. The method of claim 55 further comprising selecting data packets that are sent to a given remote location based on the type of the data field contained in the data packet.

58. The method of claim 57 wherein selecting data packets further includes-assembling the data packets into a data file to be sent, the data file composed of a predetermined number of data packets.

59. The method of claim 57 further comprising:

continually sending data packets to a given remote location; and monitoring the number of data packets sent to that given remote location and when the data packets sent exceed a predetermined amount sending data packets containing another type of data field.

60. The method of claim 59 wherein the first computer further comprises:

determining a period of time between when a given data packet was sent to a given remote location and the time the return data packet corresponding to the sent data packet was received; and rejecting the return data packet if the period of time exceeds a predetermined amount.

61. The method of claim 55 further comprising:

determining a period of time between when a given data packet was sent to a given remote location and the time the return data packet corresponding to the sent data packet was received; and rejecting the return data packet if the period of time exceeds a predetermined amount.

62. The method of claim 56 further comprising:

determining a period of time between when a given data packet was sent to a given remote location and the time the return data packet corresponding to the sent data packet was received; and rejecting the return data packet if the period of time exceeds a predetermined amount.

63. The method of claim 57 wherein the first computer further comprises:

determining a period of time between when a given data packet was sent to a given remote location and the time the return data packet corresponding to the sent data packet was received; and rejecting the return data packet if the period of time exceeds a predetermined amount.

64. The method of claim 55 further comprising encrypting the data packet prior to transmission and decrypting received encrypted data packets.

65. The method of claim 64 wherein the encryption and decryption method used is chosen from the group of encryption and decryption techniques consisting of: private key and private key/public key.

66. The method of claim 65 further comprising:

providing a security level indicator for the document; and varying the encryption and decryption technique used depending upon the security level indicator for the document.

67. The method of claim 55 further comprising:

providing a security level indicator for the document; and varying the number and size of the image segments created depending upon the security level indicator for the document.

68. The method of claim 56 further comprising encrypting the data packet prior to transmission and decrypting received encrypted data packets.

69. The method of claim 68 wherein the encryption and decryption method used is chosen from the group of encryption and decryption techniques consisting of: private key and private key.

70. The method of claim 69 further comprising:

providing a security level indicator for the document; and varying the encryption and decryption technique used depending upon the security level indicator for the document.

71. The method of claim 56 further comprising:

providing a security level indicator for the document; and varying the number and size of the image segments created depending upon the security level indicator for the document.

72. The method of claim 57 further comprising encrypting the data packet prior to transmission and decrypting received encrypted data packets.

73. The method of claim 72 wherein the encryption and decryption method used is chosen from the group of encryption and decryption techniques consisting of: private key and private key/public key.

74. The method of claim 73 further comprising:

providing a security level indicator for the document; and varying the encryption and decryption technique used depending upon the security level indicator for the document.

75. The method of claim 57 further comprising providing a security level indicator for the document; and varying the number and size of the image segments created depending upon the security level indicator for the document.

76. The method of claim 55 wherein:

the steps of populating the database field and packetizing the return packet further comprise:

providing on the data base prompt a means for the operator to indicate that the textual data in the image clip is illegible;

associating with the database field for that image clip a legibility indicator; and packetizing the legibility indicator with the database field and database record identifier;

and the step of inserting the populated database field further comprises:

checking for the presence of the legibility indicator, and, when present, rejecting the data contained in the returned data field and displaying an alert.

77. The method of claim 55 further comprising:

assigning a priority level to each data packet; and processing and transmitted a data packet based upon the assigned priority level.

78. The method of claim 55 further comprising:

assigning to a predetermined data field a rule and rule parameter used to control the entry of data into the assigned data field; and performing the assigned rule when its data field is selected by the operator at the remote location.

79. The method of claim 55 further comprising:

time stamping each data packet that is sent to a remote location with the time of its sending; and at each remote location, processing the received data packets in order of earliest to latest based on the time stamp value.

\* \* \* \* \*